United States Patent [19]

Kálmánczhelyi

[11] Patent Number: 4,564,038
[45] Date of Patent: Jan. 14, 1986

[54] HYDRAULIC FLOW DIVIDER/INTEGRATOR WITH REGULATING SLIDE VALVES WITH SINGLE CONTROL EDGE FOR TWO OR MORE CONSUMERS

[75] Inventor: Gábor Kálmánczhelyi, Budapest, Hungary

[73] Assignee: Danuvia Kozponti Szerszam-es Keszulekgyar, Budapest, Hungary

[21] Appl. No.: 574,598

[22] Filed: Jan. 27, 1984

[30] Foreign Application Priority Data

Feb. 1, 1983 [HU] Hungary .................................. 327/83

[51] Int. Cl.$^4$ ........................................... G05D 11/03
[52] U.S. Cl. ..................................................... 137/101
[58] Field of Search ................... 137/101, 118; 91/517

[56] References Cited

U.S. PATENT DOCUMENTS 4,121,601 10/1978 Presley .............................. 137/101
4,402,336 9/1983 Kiss .................................... 137/101

FOREIGN PATENT DOCUMENTS 497162 8/1954 Italy .................................... 137/118
587270 1/1978 U.S.S.R. ............................. 137/101

Primary Examiner—Robert G. Nilson
Attorney, Agent, or Firm—Karl F. Ross; Herbert Dubno

[57] ABSTRACT

A hydraulic flow divider and integrator for operating a plurality of hydraulic loads, in which a plurality of slide valves are each connected between a respective load and a source of pressurized fluid and subjected to hydraulic pressure bias from opposite ends by respective regulating spaces at the opposite ends of each slide valve, the slide valves each having an inlet communicating with the source, and a respective throttle connected between each inlet and a respective one of the regulating spaces of a respective slide valve and functioning to bias the respective slide valve in a valve opening direction, with hydraulic lines communicating between each one of the regulating spaces and the other regulating space of another of the slide valves, whereby a tendency to open one of the slide valves results in a reciprocal tendency to close the other slide valves, and another pressure source independent of the slide valves for pressurizing the one of the regulating spaces of at least one of the slide valves for locking same in an open state.

3 Claims, 4 Drawing Figures

HYDRAULIC FLOW DIVIDER/INTEGRATOR WITH REGULATING SLIDE VALVES WITH SINGLE CONTROL EDGE FOR TWO OR MORE CONSUMERS

FIELD OF THE INVENTION

The invention relates to a hydraulic flow divider and integrator for dividing the liquid flow in a desired ratio for two or more hydraulic loads, i.e. it integrates the liquid flow of two or more loads by the aid of regulating slide valves having a single control-edge.

BACKGROUND OF THE INVENTION

The Hydraulic flow dividers and integrators operate on the principle of throttling regulation. Liquid flows are compared by permanent or changeable measuring throttles, while regulation is performed by the regulating slide valves being displaced under the influence of differantial pressures, forming accessory throttles, thus ensuring the desired ratio of division i.e. integration independent of the hydraulic load.

With hydraulic gear drives synchronization independent of the load on the wheels of a vehicle used to be realized by the aid of the traditional regulating slide valves having double control-edges, by connecting three current dividers or by installing the regulating slide valves and measuring throttles in a common housing.

FIG. 1 shows this known solution, where three flow dividers having double-control edges are interconnected. With this solution it seems to be disadvantageous in that the minimal diffential pressure needed for regulation appears twice on the measuring throttles, furtheron, the liquid flow passing through the first regulating slide valve is larger than those passing through the second and third regulating slide valve and accordingly, these have expediently different geometrical dimensions.

A further disadvantageous feature lies in that the number of the measuring throttles is just the double of the number of the regulating slide valves, and the cross-section of the measuring throttles is also different, even at an equal ratio of division.

From technical literature a solution is known, with which regulation of the liquid flow is realized by means of regulating slide valves having a single control edge. FIG. 2 shows the simplified theoretical schematic of the known solution. From the figure it becomes obvious that the minimal differential pressure needed for the regulation of the liquid flow appears only once on the measuring throttles and as a consequence, energy loss will be less, and assuming an equal ratio of division, identical liquid flows will flow through the regulating slide valves, so that their geometrical dimensions are expediently identical, enabling a simpler production technology and resulting in smaller dimensions and reduced mass. The number of the measuring throttles equals the number of regulating slide valves, which equals the number of loads and in addition, the measuring throttles have equal cross-sections enabling cheaper production and structural design. Beside the advantages enumerated, this solution has several disadvantages in view of the objective: since recoupling between the regulating slide valves is formed by a liquid, expediently oil streaming in a closed space with maintenance of a constant volume, so that dimensioning of the volume in itself represents an extremely complicated task; any change in the number of the regulating slide valves required by the increase or decrease of the number of hydraulic loads becomes possible only by the complete reconstruction of the flow divider and integrator.

A further drawback of this solution is that in contrast to the solution with the double control-edge, the regulating differential pressure always puts two regulating slide valves into motion and as a consequence, effects of frictional force will be always larger and regulation will be more inaccurate, while, at the same time, regulating slide valves could not be completely eliminated in the course of regulation.

OBJECTS OF THE INVENTION

The object of the invention is to eliminate the cited drawbacks, and to provide an improved hydraulic flow divider and integrator, by the aid of which more accurate regulation can be achieved and hydraulic loads of optional number could be connected subsequently to the system without the need of any reconstruction thereof.

SUMMARY OF THE INVENTION

The invention is based on the recoupling between single regulation slide valves so that a common closed liquid circuit is divided into parts and one of a actuating spaces of the single regulating slide valve is connected to the other actuating space of a further regulating slide valve which is connected to a measuring throttle of the first slide valve.

In a preferred embodiment of the hydraulic flow divider and integrator according to the invention, in the line connecting one actuating space of a regulating slide valves with the actuating space of another regulating slide valve, throttles are inserted, and at least the actuating space of one regulating slide valve is interconnected with a control line ensuring external intervention. In such a manner, complete or partial release of the regulation of the liquid flow to the hydraulic loads upon a given control signal becomes possible.

BRIEF DESCRIPTION OF THE DRAWING

The invention will be described in detail by means of the preferred embodiments shown in the drawings wherein.

SPECIFIC DESCRIPTION

Figure 1:
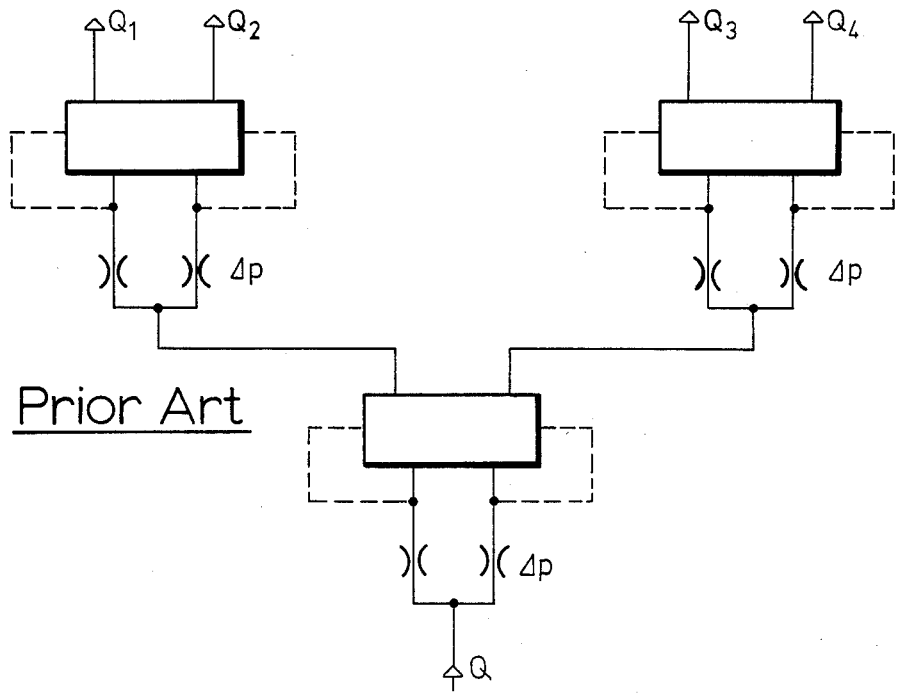
FIG. 1 is a schematic view of a current divider with three regulating slide valves having double control-edges according to the prior art.
Figure 2:
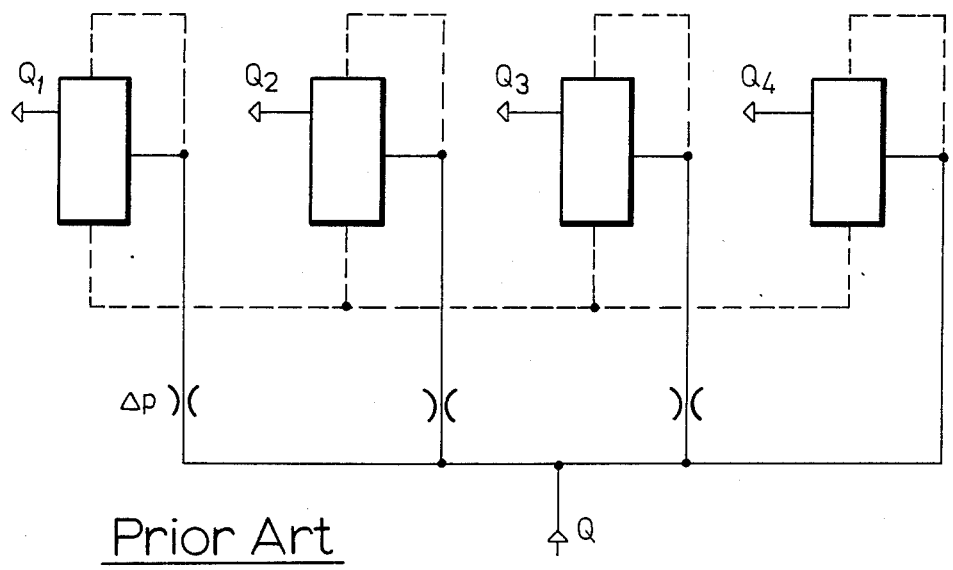
FIG. 2 is a schematic view of a further known flow divider.
Figure 3:
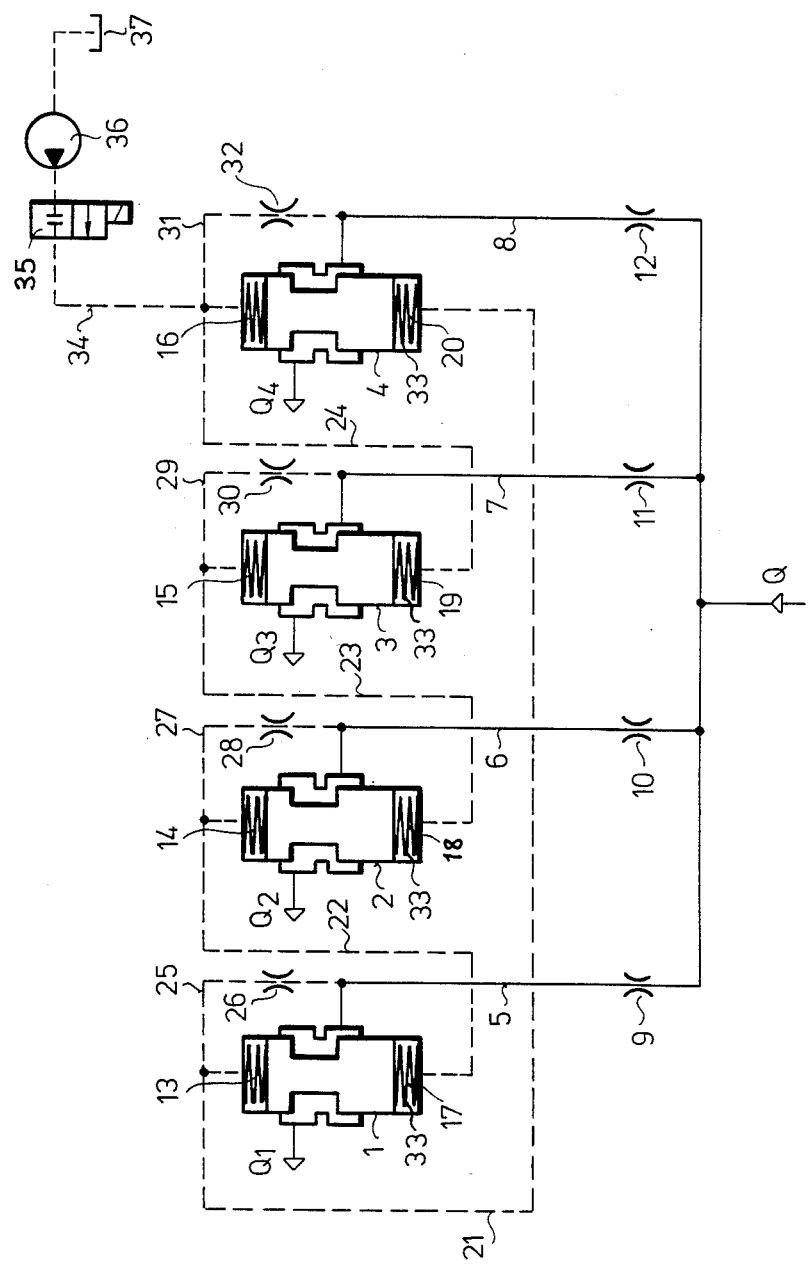
FIG. 3 illustrates schematically an embodiment according to the invention of a hydraulic flow divider and integrator with four regulating slide valves.

As shown in FIG. 3, the hydraulic flow divider and integrator according to the invention contains four regulating slide valves 1,2,3 and 4 with single control edges, which are connected via the fixed measuring throttles 9,10,11 and 12 installed in the lines 5,6,7 and 8 to the hydraulic high-pressure medium source Q. In the open position of the regulating control valves 1,2,3 and 4, the liquid is discharged through the connections $Q_1$, $Q_2$, $Q_3$ and $Q_4$. Every single regulating slide valve has an actuating space 13,14,15 and 16, which is connected to a measuring throttle of the regulating slide valve. Additional actuating spaces 17,18,19 and 20 are connected to the first actuating spaces and as such, are interconnected with the measuring throttles of the regulating slide valves.

With the present embodiment serving as an example, the actuating space 13 of the regulating slide valve 1 is connected via the line 21 to the actuating space 20 of the regulating slide valve 4, while the actuating space 14 of the regulating slide valve 2 is connected to the actuating space 17 of the regulating slide valve 1 via the line 22, the actuating space 15 of the regulating slide valve 3 is connected to the actuating space 18 of the regulating slide valve 2 via the line 23 and at last the actuating space 16 of the regulating slide valve 4 is interconnected with the actuating space 19 of the regulating slide valve 3 through the line 24. The actuating spaces 13,14,15 and 16 of the regulating slide valves 1,2,3 and 4 are interconnected through the lines with their own measuring throttles, and so in the line 25 the fixed throttle 26, in the line 27 the fixed throttle 28, in the line 29 the fixed throttle 30 and in the line 31 the fixed throttle 32 are installed. The actuating space 16 of the regulating slide valve 4 is connected to the control line 34 which ensures external hydraulic pressure intervention, which again is connected to the tank 37 through the electrically actuated switching valve 35 and the pump 36.

It can be seen that recoupling between the regulating slide valves is obtained by the communicating spaces being open on one side. Every single regulating slide valve is put into motion by the differential pressure drop prevailing on its own measuring throttle and on another, expediently on the next measuring throttle upstream thereof as long as the differential pressure is maintained at any point of the recoupling circuit in itself.

The open communicating regulating spaces enable the simple structural design, dimensioning and processing, and the simple change of the system if the number of hydraulic loads changes, at the same time far more accurate operation of the system can be achieved, as the differential pressure arising as a consequence of the deviation of the liquid flow from a given ratio moves each regulating slide valve accordingly, such that the effect of frictional force is reduced to half.

The device according to the invention depends on the position of installation of the slide in order to guarantee proper function when performing a flow dividing and integrating function, so that there are weak centering springs installed which ensure the basic position of the regulating slide valves, however, when it functions as a hydraulic differential locking deivce, it is provided with springs with a considerable spring constant ensuring less sensitivity.

Figure 4:
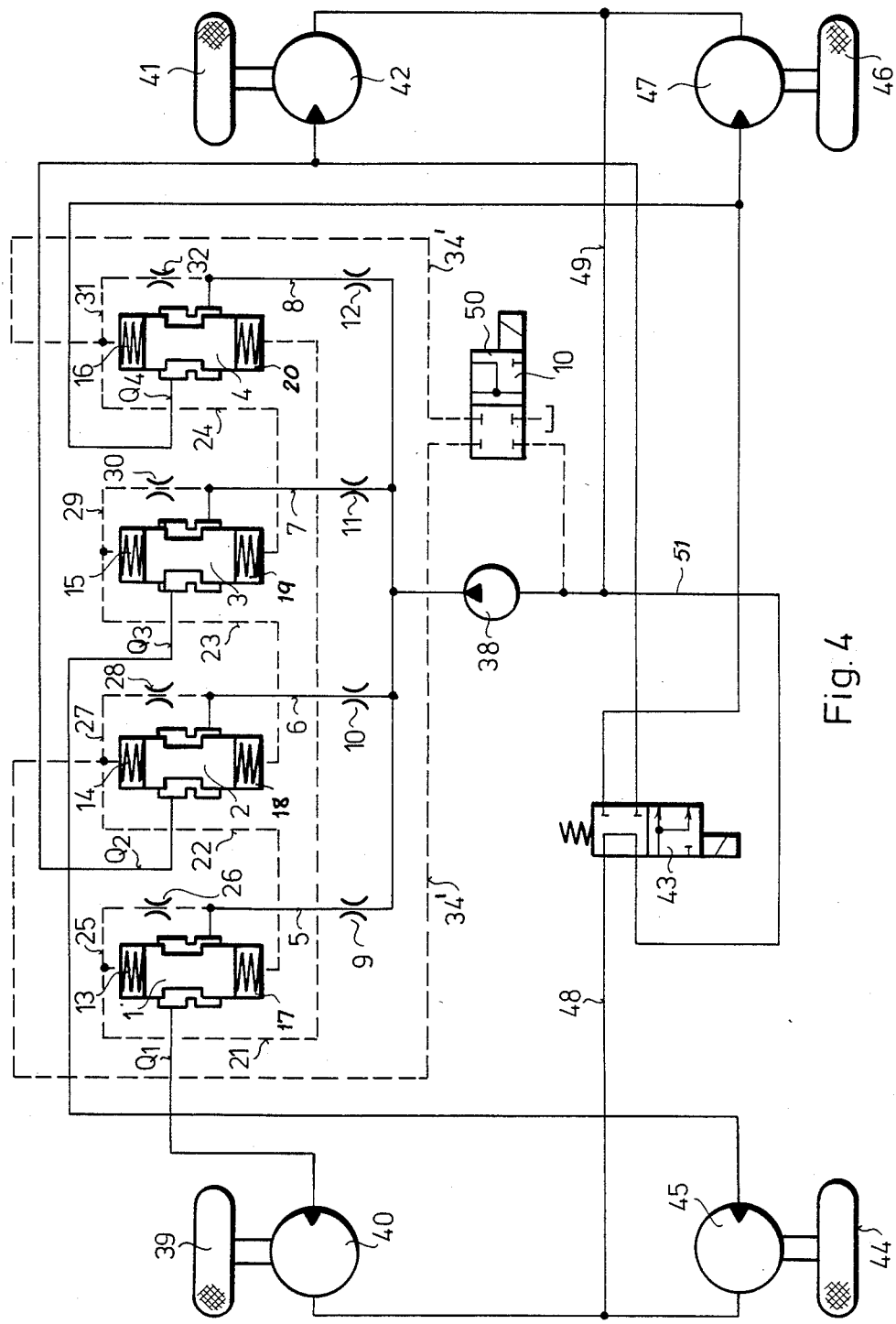
FIG. 4 shows schematically a possible application of the hydraulic flow divider and integrator according to FIG. 3, for the four-wheel drive of motor vehicles.

In the case of a four-wheel drive, the requirement my arise that in certain cases, e.g. in quick-run, the syncrhonous connection of the wheels should be stopped and the parallel connection of the four-wheel drive changed into a serial connection by pairs. That means that two regulaiing slide valves must completely open, while the other two have to assume a completely closed state. A possible solution of this task is to be seen in FIG. 4.

The liquid source Q having been connected to the regulating slide valves 1,2,3 and 4 through the measuring throttles 9,10,11 and 12 is formed by the supply pump 38. Connection $Q_1$ of the regulating slide valve 1 is connected to the hydromotor 40 driving the wheel 39, connection $Q_2$ of the regulating slide valve 2 is connected to the hydromotor 42 driving the wheel 41 and to the switching valve 43, connection $Q_3$ of the regulating slide valve 3 is connected to the hydromotor 45 driving with the wheel 44, and connection $Q_4$ of the regulating slide valve 4 is connected to the hydromotor 47 driving with the wheel 46 and to the switching valve 43. The common recirculating line 48 of the hydromotors 40 and 45, as well as the commoned recirculating line 49 of the hydromotors 42 and 47 connected parallel in the basic position of te switching valve 43 are connected to the reverse line 51 of the pump 38. The actuating spaces 14 and 16 of the regulating slide valves 2 and 4 are connected to return control lines 34; which again are interconnected with a further switching 50. In the basic position of the switching 50 the control lines 34, are separated from one another and from the reverse branch 51 of the pump 38.

When switching the valves 43 and 50, the throttles 28 and 32 in the lines 27 and 31 of the regulating slide valves 2 and 4 attenuate and thereby stop the regulating effect of the pressure from the measuring throttles 10 and 12. Now the regulating slide valves 1 and 3 are completely opened and regulating slide valves 2 and 4 are completely closed. In such a manner regulating is partially eliminated. The wheels 39, 41, 44 and 46 are asynchronously rotating, connected in series by pairs. By setting the switching valves 43 and 50 into their basic position, the differential effect is automatically restored.

In the case, if every control line 25,27,29 and 31 is connected to a regulating space having a common pressure, the regulating slide valves are returned to their basic position by the aid of the spring 33, ensuring free flow to the hydraulic loads without any regulation. Complete elimination of regulation might be required in the case of measuring tests or servicing to be performed in the partially lifted position of the vehicle.

In operation, the flows $Q_1$ to $Q_4$ are maintained constant only if the hydraulic loads remain constant and in equilibrium, the slide valves normally acting differentially in response to the loads to maintain the flows constant if one or more of the loads changes.

The throttles 26-32 function to attenuate the hydraulic pressure feeding through the lines 5-8 to a lower level suitable for the regulation of the slide valves, since relatively little pressure is required to do this, thereby making available a greater flow to the hydraulic loads.

With reference to FIG. 3, when the switching valve 35 is activated, high pressure is fed through the unthrottled line 34 into the regulating space 16, and since the pressure in space 16 is then higher than that in space 20, the slide valve 4 is displaced into a locked open position, while the high pressure from line 34 also feeds into line 24 and space 19 of slide valve 3, displacing same into a closed position and blocking the flow to $Q_3$, so that the pressure in lines 7, 29, and 23 increases and closes slide valve 2, which in the same manner acts to close slide valve 1, whereby the hydraulic flow is fed only to $Q_4$ to provide torque on at least one of the wheels when the others are slipping.

All the advantages having been enumerated are valid for hydraulic flow dividers and integrators supplying two or moe hydraulic loads, however, even though other presently used apparatuses suitable for synchronizing two hydraulic loads, are designed with one regulating slide valve having a double control-edge, for the sake of clarity it should be mentioned that the solution using two regulating slide valves, in spite of the apparent complexity of more components and bores are simpler and cheaper to make, because accurate formation of the shorter bores of the regulating slide valves can be performed more easily and the components correspond to those of other versions using single control edges and in several ways, the magnitude of the series can be increased in the course of production, representing a factor which renders manufactoring cheaper.

I claim:

1. A hydraulic flow divider and integrator for operating a plurality of hydraulic loads comprising:

a source of pressurized hydraulic fluid;

a plurality of slide valves each connected between a respective load and said source and subjected to hydraulic pressure bias from opposite ends by respective regulating spaces at the opposite ends of each slide valve, said slide valves each having an inlet communicating with said source;

a respective throttle connected between each inlet and a respective one of said regulating spaces of a respective slide valve functioning to bias the respective slide valve in a valve opening direction;

means communicating between each one of said regulating spaces and the other regulating space of another of said slide valves whereby a tendency to open one of said slide valves results in a reciprocal tendency to close the others of said slide valves; and means independent of said slide valves for pressuring the said one of said spaces of at least one of said slide valves for locking same in an open state.

2. The apparatus defined in claim 1 wherein said plurality of slide valves comprises at least four slide valves, each valve connected to a respective hydraulic drive of a four-wheel drive vehicle, each of said regulating spaces being provided with a spring for biasing the respective slide valve into a centered open flow position in the absence of a hydraulic biasing pressure.

3. The apparatus defined in claim 2, further comprising first and second hydraulic switching valves, said first switching valve being connected between the respective regulating space of a first pair of slide valves and a vent, said first pair of slide valves being connected to a first pair of hydraulic drives, and said second switching valve being connected between a second pair of hydraulic drives and said first pair of drives, whereby upon activation of said first and second switching valves said first pair of slide valves are biased into a closed position and no longer supply a pressurized hydraulic flow to said first pair of drives, and said second pair of slide valves are biased into an open position for supplying a pressurized hydraulic flow to said second pair of drives and through said second switching valve to said first pair of drives, whereby said first and second drives are driven in a differentially locked mode.

* * * * *